United States Patent [19]

Siegmann

[11] 3,846,377

[45] Nov. 5, 1974

[54] METHOD OF PRODUCING POLYETHYLENE TEREPHTHALATE FIBERS

[75] Inventor: Arnon Siegmann, Haifa, Israel

[73] Assignee: Allied Chemical Corporation, New York, N.Y.

[22] Filed: July 2, 1973

[21] Appl. No.: 375,582

Related U.S. Application Data

[63] Continuation-in-part of Ser. No. 198,407, Nov. 12, 1971, abandoned.

[52] U.S. Cl. ......... 260/75 T, 264/176 F, 264/177 F
[51] Int. Cl. ..................... C08g 17/00, B28b 3/20
[58] Field of Search ......... 264/175 F, 210 F, 177 F; 260/75 T

[56] References Cited
UNITED STATES PATENTS

| | | | |
|---|---|---|---|
| 3,210,451 | 10/1965 | Manning et al. | 264/200 |
| 3,365,528 | 1/1968 | Riley | 264/225 |
| 3,470,686 | 10/1969 | Fleming et al. | 57/140 |
| 3,506,753 | 4/1970 | Flamand | 264/176 F |
| 3,608,041 | 9/1971 | Santeangelo | 264/176 F |
| 3,737,506 | 6/1973 | Martin et al. | 264/176 F |
| 3,758,658 | 9/1973 | Riggert et al. | 264/176 F |

FOREIGN PATENTS OR APPLICATIONS

| | | | |
|---|---|---|---|
| 871,875 | 7/1961 | Great Britain | 264/177 F |

*Primary Examiner*—Jay H. Woo
*Attorney, Agent, or Firm*—Roger H. Criss; Arthur J. Plantamura

[57] ABSTRACT

A method of producing improved polyethylene terephthalate fibers by extruding a melt of the polymer through a spinneret provided with tapered apertures under a pressure in the range of 30,000 to 80,000 psi and at a temperature in the approximate range of 250°C. to 260°C., and immediately thereafter cooling the emerging filaments to a temperature below about 85°C. The tapered apertures have a generally frusto-conical cross-section with a taper ratio in the range of 15:1 to 40:1 or higher.

9 Claims, No Drawings

METHOD OF PRODUCING POLYETHYLENE TEREPHTHALATE FIBERS

CROSS-REFERENCE TO RELATED APPLICATION

This application is a continuation-in-part of application Ser. No. 198,407, filed Nov. 12, 1971, now abandoned.

BACKGROUND OF THE INVENTION

1. Field of the Invention

This invention relates to a process of forming polyethylene terephthalate fibers.

2. Discussion of the Prior Art

Polyethylene terephthalate fibers are conventionally produced by melt extruding the polymer resin through a spinneret under pressure of approximately 5,000 psi and a temperature in the range of 280° to 300°C. The spinneret is provided with apertures of a generally uniform, cylindrical, non-tapered cross-section. The fibers produced from such straight dies melt within the approximate range of 255° to 260°C. and have a crystallinity of approximately 40 percent. Crystallinity can be increased to approximately 60 percent by well known annealing steps. It would be desirable to provide polyethylene terephthalate fibers with increased strength and heat resistance especially for uses under extreme conditions, such as tire cords.

SUMMARY OF THE INVENTION

In accordance with the process of this invention, polyethylene terephthalate fibers are produced by melt extruding the polymer resin through a spinneret provided with tapered apertures under a pressure in the approximate range of 30,000 to 80,000 psi and at temperatures in the approximate range of 250° to 260°C. and immediately subsequent to exiting from the spinneret, quenching the filaments to a temperature below about 85°C. Fibers prepared under these high pressure, low temperature conditions through tapered dies will have a high degree of orientation, with between about 25 to 80 percent, preferably 50 percent, of the chains being fully extended resulting in large crystals. Such fibers will have a high strength and will melt at a temperature of about 275°C.

DESCRIPTION OF THE PREFERRED EMBODIMENTS

Crystallizable polyethylene terephthalate polymer is charged into a conventional fiber-forming extruder which is provided with tapered apertures. The polymer is heated to a temperature in the approximate range of 250° to 260°C. which is close to the melting point (about 256°C.) of the polymer. At these temperatures the polymeric mass is highly viscous. An otherwise conventional melt-extruding spinneret is provided with tapered apertures having a generally frusto-conical shaped cross-section. The taper extends from the inner wall portion of the spinneret to the outer wall portion such that the apertures have a frusto-conical cross-section extending substantially throughout their entire length. The taper of the apertures, as measured as the ratio of entrance cross-section area to exit cross-section area should be in the range of 15:1 to 40:1 or higher. A taper of approximately 25:1 is preferred. As an example, the entrance diameter of the apertures is 30 mils and the exit diameter is 6 mils.

Fibers are melt extruded by forcing the viscous polymer mass through the tapered apertures under a very high pressure. Pressures in the range of 30,000 to 80,000 psi are preferred. Immediately upon being extruded from the apertures, the resultant filaments are quenched to below about 85°C., preferably below 75°C., and more preferably in the approximate range of 20° to 25°C. by suitable quenching means located adjacent to the extruder exit. Preferred quenching means include an air cooling jet. After quenching, the filaments are collected in a conventional manner.

Fibers extruded under the above high pressure, low temperature conditions through a tapered die have a macromolecular structure different from fibers produced under conventional conditions. The fibers possess a greater amount of fully extended polymer chains than fibers produced under the prior art low pressure, high temperature processes. Fibers produced by such prior art processes have a predominant folded chain configuration which allows a high degree of orientation but only a small amount of extended chains. Fibers prepared in accordance with this invention will have a high degree of orientation and at least 25 percent of the polymer chains will be fully extended (rather than folded), resulting in large crystals of several thousands angstroms in the chain direction. Such fibers will have a very high crystalline content, up to 90 to 95 percent for polyethylene terephthalate which is usually classified as a low crystalline material; a higher tensile strength; a higher heat stability (melting point in the order of 275°C.); and a higher degree of transparency. It is believed that the beneficial properties of the fiber result from the polymer undergoing extensional flow through the tapered orifice as well as being subjected to shear forces during extrusion. The degree of extension is determined by the ratio of the square of the entrance diameter to the square of the exit diameter, with the extension increasing with increased ratios. The pressure required to force the polymer through the apertures to form the filaments will increase as the taper ratio increases.

By immediately quenching the fibers after they have undergone extensional flow in the tapered apertures, it is believed that the extended polymer chains produced during extrusion are retained by "freezing" the structure in place.

The extruding pressure should be in the approximate range of 30,000 to 80,000 psi, preferably 30,000 to 50,000 psi. Such high pressures are provided in the extruder by suitable means, such as a high torque screw.

It is believed that the fibers produced hereby consist of two morphological components, i.e., extended chain crystals which melt at about 275°C. and folded chain crystals which melt in the range of about 255° to 260°C. The fiber melting point is referred to herein as 275°C. because when the extended chain conformation is predominant, the quantity of folded chain polymer which melts at the lower temperature range is insufficient to destroy the fiber integrity at such lower temperatures.

The process of this invention may be employed to produce improved polyester fibers of the polyethylene terephthalate type, for example, polyethylene terephthalate, the polyesters derived from terephthalic acid and ethylene glycol, or other glycols, such as polyalkylene glycols having 1 to 10 carbon atoms, hexahydro-o- xylylene glycol, etc., as well as trans-bis-1,4-(hydroxymethyl)-cyclohexane, etc. The fibers are composed of at least 90 percent, preferably 95 to 97 percent, ethylene terephthalate repeating units of the formula

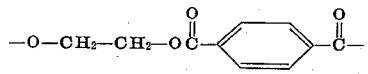

Accordingly, the term "polyethylene terephthalate" as employed herein is understood to refer to polymers containing up to about 10 mol percent and preferably less than 5 mol percent of other modifying units. Among such units which may be present in these minor amounts are diethylene glycol, other polyalkylene glycols having 1 to 10 carbon atoms, hexahdro-o-xylylene glycol, etc.; other aromatic dicarboxylic acids such as isophthalic acid, dibenzoic acid, cycloaliphatic acids such as hexahydroterephthalic acid; aliphatic acids such as adipic acid or hydroxy acids such as hydroxyacetic acid.

The higher melting point, higher tenacity fibers produced in accordance with this invention are useful in many types of articles where a high performance at high strain rates are required, such as tire cords and seat belts.

Although in the above description reference has been made to the production of fibers, it should be understood that the process of this invention may be employed to produce such elongated shapes as filaments, yarns, ribbons, etc. from a crystallizable polyester polymer.

It is understood that variations and modifications of the present invention may be made without departing from the scope of the invention. It is also to be understood that the scope of the invention is not to be interpreted as limited to the specific embodiment disclosed herein, but only in accordance with the appended claims when read in light of the foregoing disclosure.

I claim:

1. A process for forming polyethylene terephthalate fibers comprising extruding, under a pressure in the approximate range of 30,000 to 80,000 psi and at a temperature in the approximate range of 250°C. to 260°C., a melt of polyethylene terephthalate through a spinneret provided with tapered apertures of a generally frusto-conical shape, and immediately cooling the filaments exiting from said spinneret to a temperature below about 85°C.

2. The process of claim 1 wherein said apertures are tapered substantially throughout their entire length.

3. The process of claim 2 wherein the apertures have a taper, measured as the ratio between the cross-section area at the aperture entrance to the cross-section area at the aperture exit, in the range of 15:1 to 40:1.

4. The process of claim 3 wherein said taper is approximately 25:1.

5. The process of claim 1 wherein said filaments are cooled to a temperature below about 75°C.

6. The process of claim 1 wherein said filaments are cooled by passing the filaments by an air cooling jet located adjacent the aperture exit.

7. The process of claim 6 wherein said filaments are cooled to a temperature in the approximate range of 20° l to 25°C.

8. the process of claim 1 wherein said pressure is in the approximate range of 30,000 to 50,000 psi.

9. A fiber produced by the process of claim 1.

* * * * *